United States Patent [19]
Fleming, III

[11] Patent Number: 6,128,739
[45] Date of Patent: *Oct. 3, 2000

[54] APPARATUS FOR LOCATING A STOLEN ELECTRONIC DEVICE USING ELECTRONIC MAIL

[75] Inventor: Hoyt A. Fleming, III, Boise, Id.

[73] Assignee: Micron Electronics, Inc., Nampa, Id.

[ * ] Notice: This patent is subject to a terminal disclaimer.

[21] Appl. No.: 08/877,959

[22] Filed: Jun. 17, 1997

[51] Int. Cl.⁷ .............................. G08B 13/00; G06F 11/30
[52] U.S. Cl. .............................................. 713/200; 709/246
[58] Field of Search ........................... 395/200.3, 200.36, 395/200.61, 200.59, 200.68, 200.76; 713/200; 340/540, 568, 569, 571, 572; 709/246, 238, 229

[56] References Cited

U.S. PATENT DOCUMENTS

| | | | |
|---|---|---|---|
| 4,284,985 | 8/1981 | Heger et al. ........................... | 340/572.3 |
| 5,283,856 | 2/1994 | Gross et al. .............................. | 706/47 |
| 5,513,126 | 4/1996 | Harkins et al. ......................... | 709/206 |
| 5,555,426 | 9/1996 | Johnson et al. ..................... | 395/200.36 |
| 5,619,648 | 4/1997 | Cannale et al. ..................... | 395/200.36 |
| 5,630,060 | 5/1997 | Tang et al. ......................... | 395/200.36 |
| 5,765,033 | 6/1998 | Miloslavsky ........................ | 395/200.36 |
| 5,796,948 | 8/1998 | Cohen ................................ | 395/200.36 |
| 5,802,280 | 9/1998 | Cotichini et al. .................... | 395/200.3 |

OTHER PUBLICATIONS

Internet Article: "Welcome to CompuTrace", hhtp:/www-.computrace.com/about/index.html dated Mar. 12, 1997.

*Primary Examiner*—Dung C. Dinh
*Attorney, Agent, or Firm*—Trop, Pruner & Hu, P.C.

[57] ABSTRACT

An apparatus for locating a stolen computer or other electrical device is implemented by special programming stored in a program storage device. When an e-mail is being sent from the stolen electronic device, the sender address is compared to an owner address. If the sender address does not match the owner address, the e-mail is redirected or copied to e.g. a law-enforcement agency or a stolen-computer registry address.

37 Claims, 4 Drawing Sheets

APPARATUS FOR LOCATING A STOLEN ELECTRONIC DEVICE USING ELECTRONIC MAIL

CROSS-REFERENCES TO RELATED APPLICATIONS

This application is related to co-pending U.S. patent application Ser. No. 08/877,082, filed on Jun. 17, 1997 (pending) and entitled "Method for Locating a Stolen Electronic Device Using Electronic Mail," the entire disclosure of which is incorporated herein by reference.

BACKGROUND OF THE INVENTION

1. Field of the Invention

The present invention relates generally to an apparatus for locating stolen property, and more particularly to locating a stolen electronic device, such as a computer, using electronic mail.

2. Description of Related Art

Personal computers have become increasingly compact and portable and, thus, now commonly accompany business travelers into a variety of unprotected, public places. As a result, these items have become a favorite target for thieves. Portable computers, such as notebook and laptop computers, are commonly stolen in public places such as airports.

Many computers, especially portable computers, are equipped with modems for remote communication. These modems allow the user access to services such as remote connections to office networks and the Internet. In addition, the modems allow the user to transmit and receive facsimiles and electronic mail messages (e-mail).

E-mail Format

An e-mail typically has at least three components, a sender address, a recipient address, and message data. An Internet mail address has two parts, separated by an "at" sign (@). A sample mail address is:

name@domain

The "name" portion of the address is a string of characters, typically letters and/or numbers that represent the person sending or receiving the e-mail. The name may be a portion of the user's name or an alias for that person. The "domain" portion represents the destination or origination of the e-mail, which is typically a host service. The domain name generally represents the server where the individual referenced by the "name" portion receives or sends e-mail. The domain name commonly takes the form of "server.com" or "server.org", where ".com" represents a commercial entity, and ".org" represents an organization. Thus, an e-mail address of "jsmith@mailserver.org", may represent a user John Smith who receives e-mail at the domain of mailserver.org. Multiple recipient addresses usually may be specified in a single e-mail.

The message data represents the section of the e-mail that contains information that the sender wants to convey to the recipient such as a text message, encoded files, attached files, or the like.

Messaging Protocol for E-mail

There are a number of different messaging protocols for transmitting e-mail like those described above either in use or being proposed. Examples of messaging protocols are Simple Mail Transfer Protocol (SMTP), Extended Simple Mail Transfer Protocol (ESMTP), Post Office Protocol (POP), and Unified Message Protocol (UMP). For illustrative purposes, this specification will describe the use of SMTP protocol. However, it is to be understood that the invention may be implemented using any messaging protocol that is now known or in the future may become known in the art.

When sending an e-mail, a computer transmits the e-mail through a modem using, e.g., SMTP protocol. EUDORA™ sold by Qualcomm, Inc. of San Diego, Calif. is an example of an application program that sends e-mails in SMTP format.

Systems to Track Stolen Computers

At least one known computer tracking system for locating stolen computers exists. A user desiring to use this system first installs a software program on his computer. The software program instructs the computer to call a third party monitoring service at regular intervals. When the computer calls the monitoring service, the computer establishes a data link and transmits data to the monitoring service that identifies the computer. When the monitoring service receives a call from the user's computer, the monitoring service is able to determine the location of the computer by utilizing Caller ID. The location of the computer may then be forwarded to a law enforcement agency so that they may retrieve the computer. However, such a tracking system is not optimal because it requires a third party monitoring service. This monitoring service charges a fee for monitoring. In addition, the system is not optimal because the system incurs long distance charges that result from the periodic phone calls to the monitoring service. (Even if 1-800 numbers are used, the charges are still indirectly paid by a user subscribing to the monitoring service). The presence of such long distance phone charges may also alert a thief to the monitoring, thus reducing the effectiveness of the tracking system.

Thus, there is a need for a more optimal method of locating a stolen computer.

SUMMARY OF THE INVENTION

One embodiment of the invention is an electrical device including a processor adapted to execute program instructions and a program storage device. The program storage device contains program instructions that when executed identify that an e-mail is being sent from the electronic device. Next, a sender address is compared to an owner address. If the sender address does not match the owner address, the e-mail is redirected. In some embodiments, the electronic device is a computer. In other embodiments, the electronic device is a modem.

A second embodiment of the invention is a program storage device encoded with instructions that when executed perform a method for locating an electronic device. The method includes identifying that an e-mail is being sent from the electronic device. Next, the sender address is compared to an owner address. If the sender address does not match the owner address, the e-mail is redirected.

DESCRIPTION OF ILLUSTRATIVE EMBODIMENTS

Description of the First Embodiment

Figure 1:
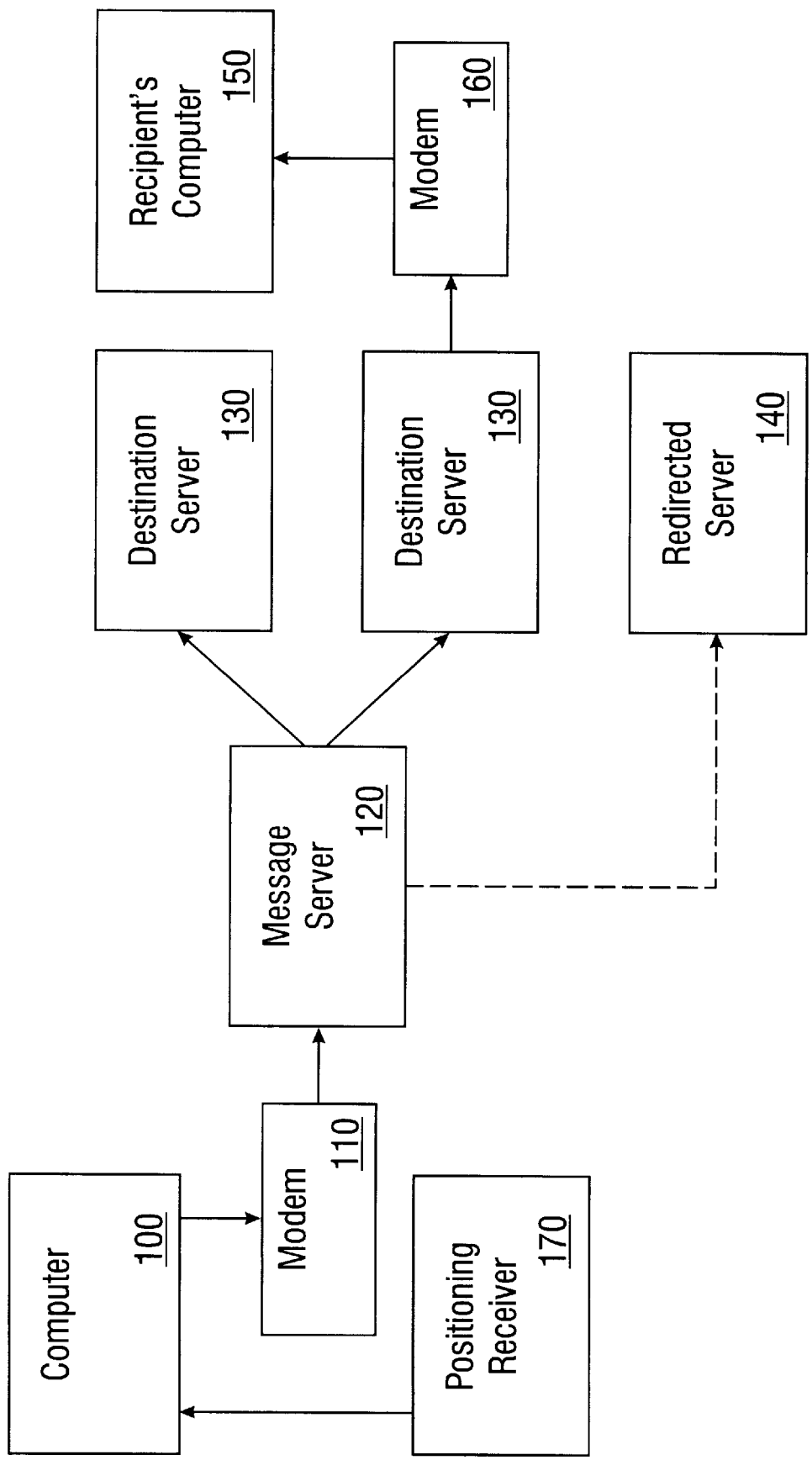
FIG. 1 illustrates a messaging system used to transmit electronic messages, such as may be used to implement some embodiments of the invention.

FIG. 1 shows one embodiment of the invention. This embodiment includes an electronic device that is capable of sending e-mails, which in the particular embodiment disclosed is a personal computer 100. In addition, the embodiment of FIG. 1 includes a modem 110, a message server 120, destination servers 130, a redirected server 140, a recipient computer 150, and a second modem 160.

Electronic Device

The invention will be described in reference to a personal computer 100 as the electronic device. However, the invention is applicable to any electronic device capable of sending e-mails. Other electronic equipment, such as satellite receivers, are currently capable of sending and receiving e-mail. As the integration of multimedia devices progresses, it is contemplated that devices such as televisions, telephones, and other media devices will have e-mail capabilities, and thus they will also be capable of being tracked through e-mail if stolen in accordance with the present invention. Hence, the term "electronic device" as used herein shall be broadly construed to encompass any electronic device capable of sending e-mail.

As shown in FIG. 1, the computer 100 is conventionally coupled to the modem 110 and is capable of sending e-mails through the modem.

Figure 2:
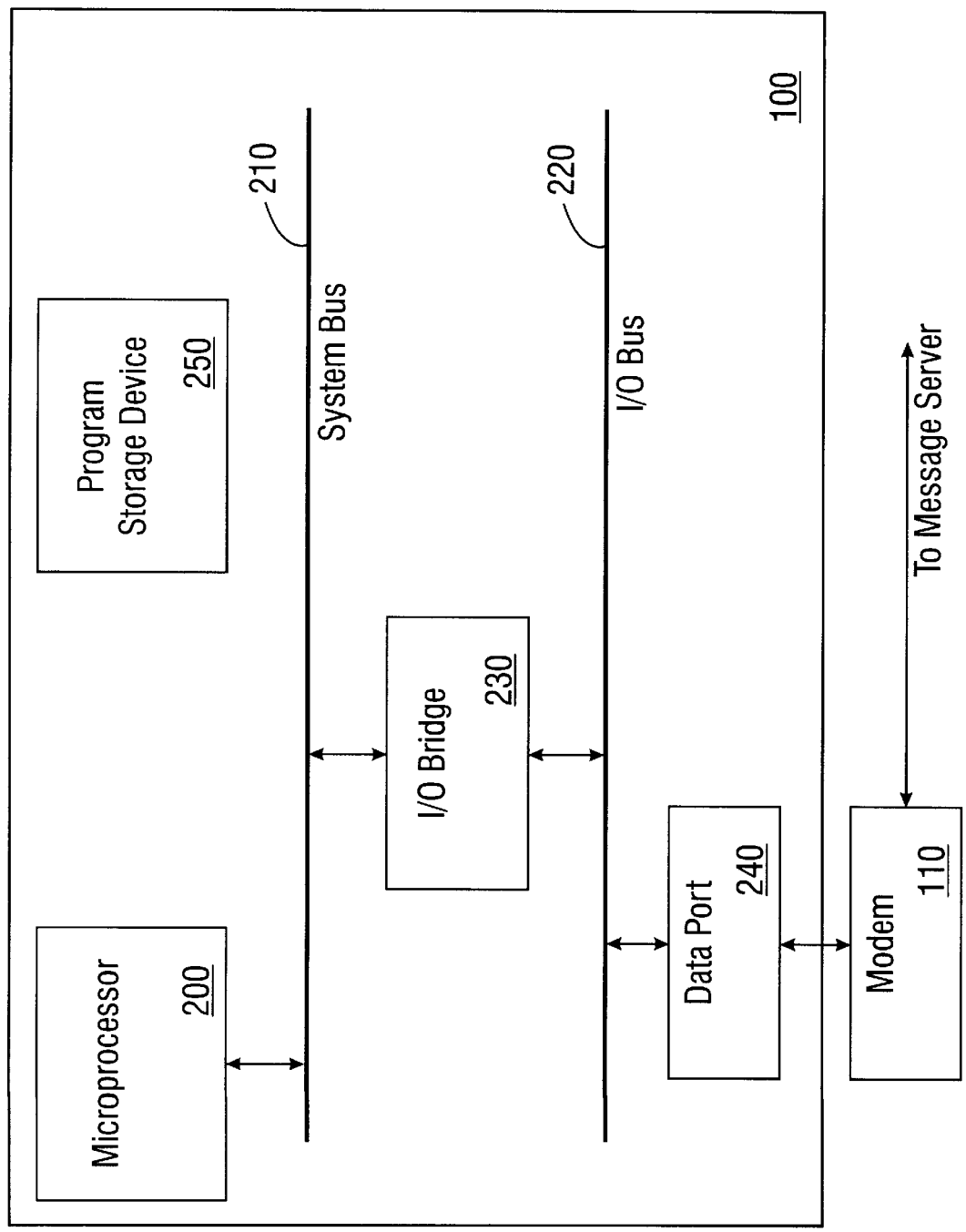
FIG. 2 illustrates a simplified block diagram of the computer and modem of FIG. 1.

A simplified block diagram of the computer 100 as conventionally coupled to the modem 110 is shown in FIG. 2. The representation of the computer 100 is for illustrative purposes and not to be regarded as limiting the application of the invention. As shown in FIG. 2, the computer 100 contains a microprocessor 200 for executing program instructions. The microprocessor 200 is connected to a system bus 210 for sending and receiving data. Other devices that communicate with the microprocessor 200 may also be connected to an I/O bus 220. An I/O bridge 230 is connected between the system bus 210 and an I/O bus 220. A modem 110 is connected to the computer 100 through a data port 240. The data port 240 is commonly referred to as a communications port, COM port, serial port, or universal asynchronous receiver/transmitter (UART).

Modem

The modem 110 shown in FIGS. 1 and 2 is a conventional modem. Modems are well known in the art. Many computers are equipped with modems for remote communication. These modems may be internal or external modems. As shown in FIG. 1, the modem 110 in one particular embodiment is coupled to the computer 100 and also to a message server 120.

Method of Operation of the First Embodiment

Figure 3:
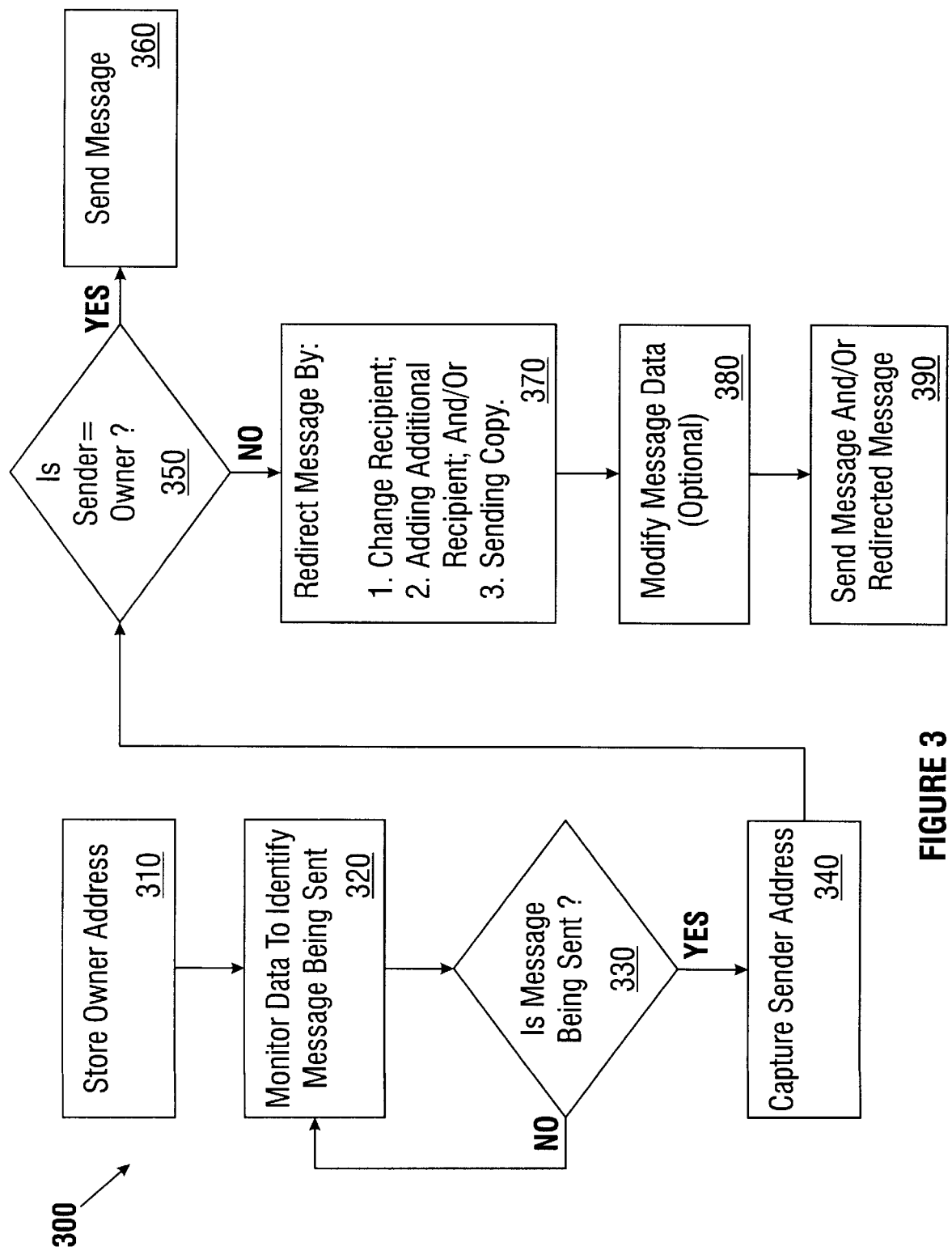
FIG. 3 is a flow diagram for a method to locate a stolen computer system using electronic mail.

Referring to FIG. 3, a flow chart for one embodiment of a method of locating a stolen electronic device, such as the computer 100 in accordance with the present invention is shown. The method may be implemented by a location tracking program 300 that is conventionally executed on the computer 100. If the computer 100 is stolen, it is conceivable that the thief will eventually use the computer to send an e-mail. The thief will most likely change the sender address used by the mail application program to reflect his own address, hereinafter referred to as the thief address.

As shown in block 310, the owner's electronic mail address is first conventionally stored in the computer 100. This may, in some embodiments, be done while installing the location tracking program 300 on the computer 100.

Next, the location tracking program 300 monitors a data stream to identify if an e-mail is being sent. Determining whether an e-mail is being sent may be performed by several methods. If the computer is running Microsoft® Windows®, then the Microsoft® Windows® Sockets language may be utilized intercept the data stream that is sent from an e-mail application program to a serial port. On the other hand, if a computer is not running or is not capable of running Microsoft® Windows®, then conventional programming techniques may be used to monitor the data present in memory location(s) that are assigned to a particular data port. Thus, by monitoring the data stored in such data location(s) over time, it is possible to determine the data stream that is being sent to a particular port. Regardless of the particular method utilized to obtain the data stream, after the data stream is obtained, the stream may be parsed to determine if an SMTP header is present. If such a header is present, then an e-mail is being sent.

If an e-mail is identified in block 330, the header is parsed and the sender address is captured in block 340. The sender address is then compared to the stored owner address in block 350. If the sender address matches the owner address, the e-mail is sent unimpeded in block 360. If the sender address does not match the owner address, the sender address is identified as a potential thief address and the e-mail is redirected in Block 370. When the owner receives the e-mail, he may then contact the service provider of the thief and obtain the name and address of the thief. Such information may then be provided to a law enforcement agency so that the agency may retrieve the computer 100.

There are several ways to redirect the e-mail if a thief address has been identified in various alternative embodiments of the method of FIG. 3. In some embodiments, the SMTP header of the e-mail may be altered before it is sent or the SMTP header may be copied into a buffer and an additional redirected e-mail may be sent. Several illustrative embodiments are listed below. These embodiments may be implemented individually or several embodiments may be combined.

Description of the Second Embodiment

Rather than sending the e-mail to the recipient address at the destination server 130, the e-mail may be routed to a redirected server 140, shown in FIG. 1, for delivery to the true owner of the PC. The location tracking program 300 in this embodiment modifies the e-mail SMTP header by substituting the owner address for the recipient address. Thus, the true owner of the computer 100 will receive the e-mail that is sent by the thief. In this embodiment, the recipients would not receive the e-mail, which may alert the thief to the presence of the monitoring.

Description of the Third Embodiment

In a third embodiment, the location tracking program 300 modifies the e-mail by appending the owner address to the list of recipient addresses. In this embodiment, the recipients would know that the owner also received the e-mail. The owner address would also be sent back to the thief on any replies from the recipients, which may also alert the thief to the presence of the e-mail redirection.

Description of the Fourth Embodiment

In a fourth embodiment, the location tracking program 300 copies the e-mail, sends the original e-mail to the original recipient addresses, modifies the copy by deleting the original recipient addresses and substituting the owner address, and sends the copy to the owner. In this embodiment neither the thief nor the recipients receive any indication that the e-mail was redirected.

Description of the Fifth Embodiment

In a fifth embodiment, the location tracking program 300 redirects the e-mail to a third party such as a law enforcement agency or a monitoring service by deleting the original recipient addresses and substituting a third party address. This embodiment may be combined with any of the other embodiments to notify a third party, such as a law enforcement agency or monitoring service, that the computer may have been stolen. The third party may be notified in conjunction with or in lieu of the owner.

Description of the Sixth Embodiment

In a sixth embodiment, the message data of the redirected e-mail may be modified as seen in block 380 of FIG. 3 before being sent in block 390, to give further information concerning the computer 100 or its location. For example, the computer serial number, owner telephone number, owner home or business address, owner e-mail address or other identifying data may be included in the e-mail. An example of such a modification may include the following text.

"This computer (Ser. No. # 13D456G1) may have been stolen This computer has been registered to OWNER@MYSERVER.COM and mail was sent from THIEF@SERVER.COM".

In this particular embodiment, the serial number of the computer and e-mail addresses of the owner and thief were added to the e-mail. The thief could be tracked by contacting the independent service provider that the thief uses to send and receive e-mails Description of the Seventh Embodiment In another embodiment a positioning receiver 170 (shown in FIG. 1), such as a global positioning system (GPS) receiver may be attached to or integrated into the computer 100. A positioning receiver 170 may be especially useful in a portable computer. The cost and size of GPS receivers has been reduced to the point where it is now feasible to include such a receiver in a computer system. A positioning receiver 170 installed on the computer 100 may be used by the location tracking program 300 to modify the message data to include the geographical coordinates of the stolen computer 100.

Description of the Eighth Embodiment

One particular embodiment of the invention may be used to help foil attempts by a thief to circumvent security measures after stealing the computer 100. For instance, to erase any type of security program present on the computer 100, a thief may reformat the hard disk drive. Thus, one embodiment of the invention stores the tracking program 300 in a program storage device separate from the hard disk drive. For example, the tracking program 300 may be conventionally stored in a PROM, EPROM, or EEPROM. Such storing would typically be performed by a computer manufacturer. In addition, the owner address may be stored in a section of a hard disk drive, such as the boot sector, that is not overwritten during a hard disk drive reformat operation. Alternatively, the owner address may be stored in CMOS memory such as the CMOS memory that stores the computer's setup parameters. Thus, the program storage device 250 of FIG. 2 may be a hard disk, PROM, EPROM, EEPROM, CMOS memory, or any other such suitable storage device that is known in the art.

Description of the Ninth Embodiment

Figure 4:
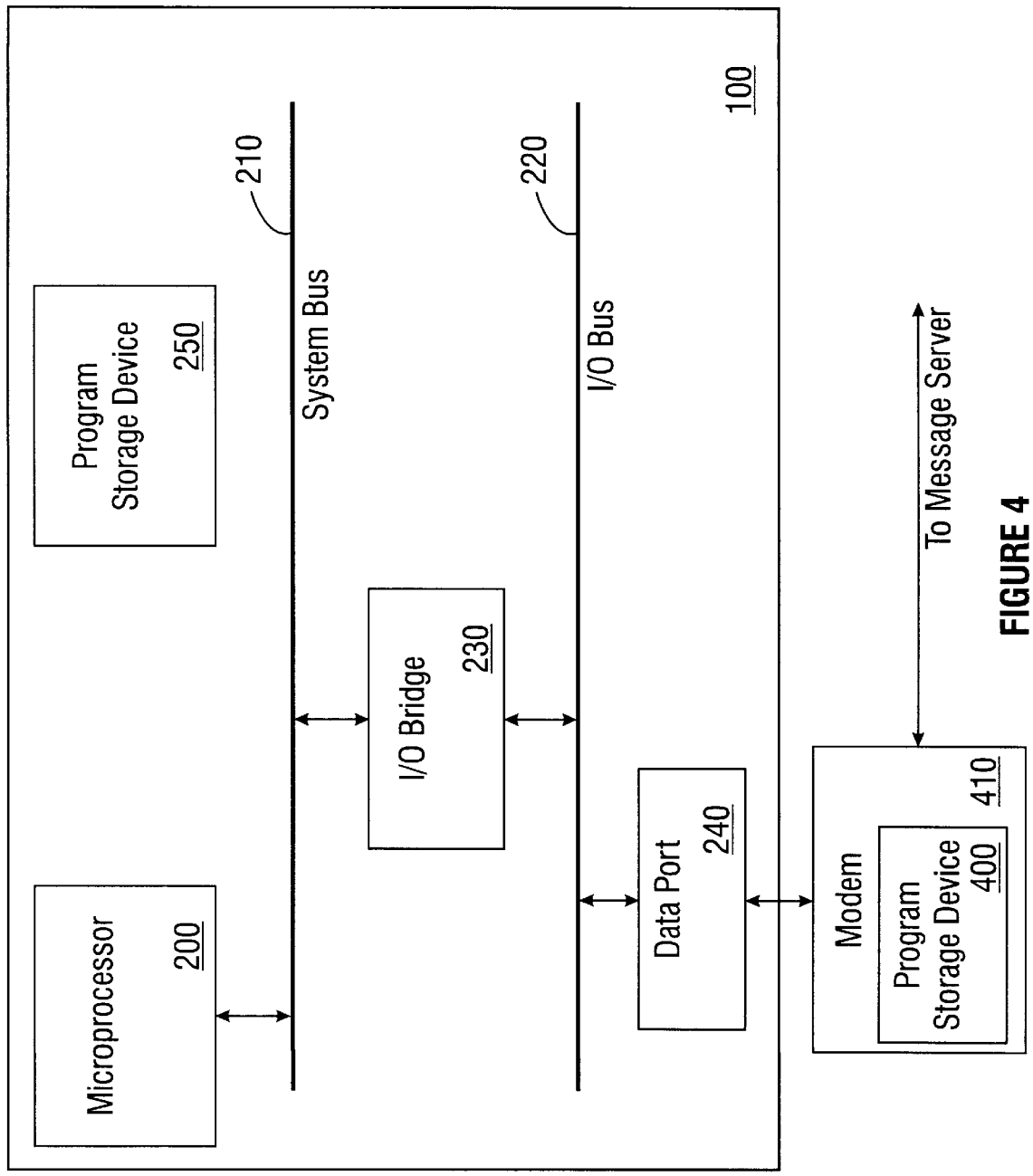
FIG. 4 is a simplified block diagram of an alternative embodiment of the computer and modem of FIG. 1.

In still another embodiment, as shown in FIG. 4, the location tracking program 300 may be stored in a program storage device 400 within the modem 410. Many conventional modems contain PROM, EPROM, or EEPROM program storage devices that contain initialization code for the modem. Thus, the owner phone number could be stored in either a program storage device 400 within the modem 410 or a program storage device 250 within the computer 100 as discussed above.

Description of the Tenth Embodiment

In another embodiment, the owner address may be modified only if a predetermined password is provided. The initial password may be set by a user who installs the tracking program 300. Alternatively, the initial password may be set by the manufacturer of the computer if it installs the location tracking program 300. The latter is advantageous since, if the computer 100 is "lost in shipping" from the computer manufacturer to the computer owner, the manufacturer may be able to locate the "lost" computer 100.

Description of the Eleventh Embodiment

In still another embodiment, if the thief tried to circumvent the security measures by removing power to the CMOS setup memory, thus resetting the CMOS setup values to their default values, a default owner address may be used. The default owner address may represent an address of the computer manufacturer. The e-mail may be redirected to the default owner address. The message data sent to the default owner address may be modified to include identifying information such as the serial number of the computer 100 or registration number of the location tracking program 300.

Combination of Embodiments

As discussed above and illustrated in FIG. 3, several of the embodiments may be combined. For instance, the e-mail may be redirected to the owner, a third party, or both. The redirection can occur by adding the owner address, third party address, or both to the list of recipients. Redirection can also occur by changing the recipient address to the owner address, third party address, or both. Some embodiments may not only add additional addresses, but may also delete the original recipient address. Other embodiments may make a copy of the original e-mail and transmit the copy to the owner address, third party address, or both. Still other embodiments may include modifying the message data to provide additional information regarding the identity, location, or both the identity and the location of the computer. One or more of the alternative embodiments discussed above may therefore be combined, and all such alternative embodiments are considered within the scope and spirit of the invention.

Remarks

The disclosed invention can be practiced in numerous different embodiments to provide users with simple and efficient methods of locating and retrieving stolen electronic devices such as portable computers. The methods do not require the expense of third party monitoring services, and do not require that long distance calls be placed by the computer. Thus, thieves will not be alerted to the presence of the tracking program by long distance phone charges on their phone bill.

Those skilled in the art will now see that certain modifications can be made to the methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. An electrical device, comprising:

(i) a processor adapted to execute program instructions; and (ii) a program storage device containing program instructions that when executed:

(a) monitor output data of an e-mail application program to detect that an electronic message, referred to as an e-mail, is to be sent by the electronic device from a sender address to a recipient address specified in the e-mail;

(b) compare the sender address to a predetermined owner address; and (c) redirect the e-mail message in a specified manner if the sender address does not match the owner address.

2. The electrical device of claim 1, wherein the program instructions to redirect the e-mail include program instructions that when executed:

(c1) change the recipient address to the owner address; and (c2) send the e-mail to the owner address.

3. The electrical device of claim 2, wherein the program instructions to redirect the e-mail include program instructions that, when executed:

(c3) send the e-mail to the recipient address.

4. The electrical device of claim 1, wherein the program instructions to redirect the e-mail include program instructions that when executed:

(c1) add the owner address as an additional recipient address; and (c2) send the e-mail to the recipient address and the additional recipient address.

5. The electrical device of claim 1, wherein the program instructions when executed:

modify the e-mail to include an indication that the e-mail was redirected.

6. The electrical device of claim 1, wherein the program instructions to detect that an e-mail is to be sent include program instructions that when executed:

(a1) monitor a data stream transmitted by a modem to identify the e-mail being sent.

7. The electrical device of claim 1, wherein the electrical device is a modem.

8. The electrical device of claim 1, wherein the program instructions to detect that an e-mail is to be sent include program instructions that when executed:

(a1) monitor data sent through a data port to identify the e-mail being sent.

9. The electrical device of claim 1, wherein the program instructions to redirect the e-mail include program instructions that when executed:

(c1) copy the e-mail to generate a copied e-mail; and (c2) redirect the copied e-mail.

10. The electrical device of claim 1, wherein the program instructions when executed:

modify the e-mail to indicate the geographical position of the electronic device.

11. The electrical device of claim 1, wherein the program instructions to redirect the e-mail include program instructions that when executed:

(c1) change a recipient address to a third party address; and (c2) send the e-mail to the third party address.

12. The electrical device of claim 11, wherein the program instructions to change the recipient address include program instructions that when executed:

change the recipient address to the third party address, wherein the third party address is an e-mail address for a law enforcement agency.

13. The electrical device of claim 1, further comprising:

(iii) a setup memory, and (iv) wherein the program instructions when executed:

store the owner address in the setup memory of the electronic device.

14. The electrical device of claim 13, wherein the program instructions when executed:

update the owner address only when a predetermined password is provided.

15. The electrical device of claim 13, wherein the program instructions when executed:

reset the owner address to a default address when the setup memory is erased; and modify the e-mail to indicate an identifying characteristic of the electronic device or the owner of the electronic device.

16. The electrical device of claim 1, wherein the electrical device is a computer system.

17. The electrical device of claim 1, wherein the electrical device is a computer system that is capable of running Microsoft® Windows®.

18. An electronic device containing (1) a processor, and (2) a program storage device containing program instructions, executable by the processor, to cause the electronic device to perform operations comprising:

(a) detecting that an electronic message, referred to as a sender's e-mail, is to be sent by the electronic device to a recipient address associated with the e-mail;

(b) comparing a sender address associated with the sender's e-mail to a predetermined owner address; and (c) if the sender address does not match the owner address, then sending an electronic message containing identifying information about the electronic device, referred to as a reporting e-mail, to (i) the owner address, and (ii) an address of a monitoring service.

19. A program storage device encoded with instructions that when executed perform a method comprising:

(a) detecting that an e-mail is being sent from an electronic device by monitoring the output data of an e-mail application program;

(b) comparing a sender address to an owner address; and (c) redirecting the e-mail in a specified manner if the sender address does not match the owner address.

20. A program storage device as in claim 19, wherein the act of redirecting in the method includes:

(c1) changing a recipient address to the owner address; and (c2) sending the e-mail to the owner address.

21. A program storage device as in claim 20, wherein the act of redirecting in the method includes:

sending the e-mail to the recipient address.

22. A program storage device as in claim 19, wherein the act of redirecting in the method includes:

(c1) adding the owner address as an additional recipient address; and (c2) sending the e-mail to a recipient address and the additional recipient address.

23. A program storage device as in claim 19, the program storage device encoded with instructions that when executed perform the method further comprising:

modifying the e-mail to include an indication that the e-mail was redirected.

24. A program storage device as in claim 19, wherein the act of detecting in the method includes:

monitoring a data stream transmitted by a modem to identify the e-mail being sent.

25. A program storage device as in claim 19, wherein the act of detecting in the method includes:

monitoring data sent through a data port to identify the e-mail being sent.

26. A program storage device as in claim 19, wherein the act of redirecting in the method includes;

copying the e-mail to generate a copied e-mail; and redirecting the copied e-mail.

27. A program storage device as in claim 19, the program storage device encoded with instructions that when executed perform the method further comprising:

modifying the e-mail to indicate the geographical position of the electronic device.

28. A program storage device as in claim 19, wherein the act of redirecting in the method includes:

changing a recipient address to a third party address; and sending the e-mail to the third party address.

29. A program storage device as in claim 28, wherein the act of changing in the method includes:

changing the recipient address to the third party address, wherein the third party address is an e-mail address for a law enforcement agency.

30. A program storage device as in claim 19, the program storage device encoded with instructions that when executed perform the method further comprising:

storing the owner address in a setup memory of an electronic device.

31. A program storage device as in claim 30, the program storage device encoded with instructions that when executed perform the method further comprising:

updating the owner address only when a predetermined password is provided.

32. A program storage device as in claim 30, the program storage device encoded with instructions that when executed perform the method further comprising:

resetting the owner address to a default address when the setup memory is erased; and modifying the e-mail to indicate an identifying characteristic of the electronic device or the owner of the electronic device.

33. An electronic device containing (1) a processor, and (2) a program storage device containing program instructions, executable by the processor to cause the electronic device to perform operations comprising:

(a) detecting that an electronic message, referred to as a sender's e-mail, is to be sent by the electronic device to a recipient address associated with the e-mail;

(b) comparing a sender address associated with the sender's e-mail to a predetermined owner address; and (c) if the sender address does not match the owner address, then sending an electronic message containing identifying information about the electronic device, referred to as a reporting e-mail, to at least one specified address.

34. The electronic device of claim 33, wherein the program instructions further comprise instructions to cause the electronic device to send the sender's e-nail to the sender address.

35. The electronic device of claim 33, wherein the reporting e-mail includes a copy of the sender's e-mail.

36. The electronic device of claim 33, wherein the at least one specified address includes an address of a monitoring service.

37. The electronic device of claim 33, wherein the at least one specified address includes the owner address.

* * * * *